United States Patent [19]

Baecklund

[11] Patent Number: 4,814,198

[45] Date of Patent: Mar. 21, 1989

[54] METHOD OF CONTROLLING AND/OR MEASURING LAYER THICKNESS SUCH AS THE THICKNESS OF SURFACE LAYERS

[75] Inventor: Per Baecklund, Oskarshamn, Sweden

[73] Assignee: Refina Instruments AB, Högsby, Sweden

[21] Appl. No.: 115,057

[22] Filed: Oct. 30, 1987

[30] Foreign Application Priority Data

Nov. 24, 1986 [SE] Sweden ............................... 8605019

[51] Int. Cl.$^4$ ........................... B05D 1/00; B05B 5/00
[52] U.S. Cl. ............................................ 427/9; 427/8; 427/10; 427/160
[58] Field of Search .................... 427/8–10, 427/160

[56] References Cited

U.S. PATENT DOCUMENTS

| | | | |
|---|---|---|---|
| 2,897,371 | 7/1959 | Hasler | 427/9 |
| 3,019,336 | 1/1962 | Johns | 427/9 |
| 4,135,006 | 1/1979 | Readal et al. | 427/9 |
| 4,250,382 | 2/1981 | Libby | 427/10 |
| 4,292,341 | 9/1981 | Marcuse et al. | 427/10 |

*Primary Examiner*—Janyce Bell
*Attorney, Agent, or Firm*—Staas & Halsey

[57] ABSTRACT

When controlling and/or determining the thicknesses of layers or surface coatings there is chosen a coating composition that incorporates a fluorescing indicator substance, the proportions of which in the coating composition can be measured by X-ray fluorescence. The coating composition is applied to a substrate surface in solution, slurry or molten form and the thickness of the coating, or layer, is controlled and/or monitored in accordance with the intensity of the light which fluoresces from the coating.

20 Claims, No Drawings

METHOD OF CONTROLLING AND/OR MEASURING LAYER THICKNESS SUCH AS THE THICKNESS OF SURFACE LAYERS

BACKGROUND OF THE INVENTION

The present invention relates to a method of controlling and/or measuring the thickness of layers, such as the thickness of surface layers, and more particularly, although not exclusively, to controlling the thickness of seizing glue on paperboard, the thickness of kaolin coatings on paper and/or paperboard, the thickness of glue coatings when glueing or bonding plastic foil, the thickness of varnish layers on wood, the thickness of priming coatings of clear varnish on light-coloured woods, and the thickness of plastic coatings on plastic mats or floorings.

Methods for, e.g., controlling and monitoring the application of glue and glue coatings are at present not usually applied in industrial manufacturing processes.

SUMMARY OF THE INVENTION

The object of the present invention is to provide a method for controlling and monitoring different types of coatings on different substrate surfaces, such as glue coatings on paper and paperboard.

The method according to the invention is characterized by using a coating material that contains an indicator substance which will fluoresce in the X-ray wavelength band and which can be measured with regard to the proportion in which it is present by means of X-ray fluorescence; by forming a solution, a slurry or a melt from said coating material and applying the solution, slurry or melt to a substrate surface while controlling and/or monitoring the thickness of the coating in response to the intensity of the fluorescence emitted from the coating.

DESCRIPTION OF THE PREFERRED EMBODIMENT

An investigation was carried out for the purpose of seeing how well the thickness of glue coatings can be controlled by means of the method according to the invention, this investigation being regarded as an exemplifying investigation only. The investigation comprised a series of tests in which the starch-gum dextrin, containing an addition of calcium carbonate, was coated on paperboard samples in various ways, whereafter the coatings were allowed to dry and the thicknesses of the coatings measured by X-ray fluorescence. The coating thicknesses were measured with the aid of a cobalt anode and by measuring the intensity of the fluorescence emitted by the calcium present. Each coated sample was measured four times and was rotated through 90° between each measuring operation. The mean values of the measurements obtained were entered on a diagram in which the intensity of the fluorescence was given as a function of coating thickness. Each measuring operation had a duration of approximately 20 seconds. The glue used in the tests contained approximately 5% calcium carbonante and the glue remainder had a dry solids content of 45%. The glue solution was thinned with distilled water to twice its original volume prior to being sprayed onto the paperboard.

It was found that the thickness of the coatings could be measured by means of X-ray fluorescence to an accuracy in the vicinity of 1%. The intensity of the fluorescence emitted from the coatings is substantially proportional to the thickness of the coatings.

The method according to the present invention is not restricted to measuring the thickness of glue coatings on paper and paperboard, but can also be used to measure the thickness of glue coatings when glueing plastic foil, in which ease the base glue is an isocyanate glue to which there is added chlorinated paraffins, and the intensity of the fluorescence radiated by the chlorine present is measured to give the thickness of the coating. Alternatively, the inventive method can also be used to measure the thickness of priming coats of clear varnish containing titanium oxide by measuring the intensity of the fluorescence radiated by the titanium present.

As beforementioned, the invention can also be applied to measure the thickness of plastic coatings on plastic substrates, such as plastic floorings, mats, etc. In this case strontium is added to or used as a component of the chalk used as a filler in the synthetic resin and the intensity of the fluorescence radiated by the strontium present is measured as an indication of the thickness of the plastic coating. The thickness of plastic coatings on plastic floorings, mats, etc., can also be measured, by masuring the intensity of the fluorescence radiating from zirconium which is introduced into the system by adding zirconium oxide to or using zirconium oxide as a component of titanium oxide. The thicknesses of glue coatings on the curved apex surfaces of corrugated paperboard can also be measured by means of the invention method, by adding zinc-oxide to starch gum or acrylate gum.

According to the invention, layer thicknesses on substrates are measured. However, theoretically there is no need for a substrate at all in order to determine the thickness of a layer by means of the method according to the invention as it is the layer itself that fluoresces and not the substrate.

As far as corrugated paperboard is concerned, the layer referred to does not form the surface of the paperboard as there is an outer paper applied upon the corrugated layer.

What I claim is:

1. A method of controlling layer thicknesses of coatings on a substrate, comprising the steps of:
    adding an indicator substance which fluoresces in the X-ray wavelength band to a coating composition, the proportion in which the indicator substance is present being measurable by X-ray fluorescence;
    forming a solution, slurry or melt from the coating composition after said adding step; and
    applying the solution, slurry or melt to a substrate as a coating while controlling the thickness of the coating on the basis of the intensity of the X-ray fluorescence emitted from the coating.

2. A method according to claim 1, wherein said method includes controlling the grammage, or surface weight, of a dextrin or an acrylate glue coating on paperboard, wherein said adding step comprises adding to the glue a predetermined quantity of calcium carbonate, and wherein said applying step comprises the substeps of:
    applying a coating of the glue including the calcium carbonate to the paperboard;
    measuring the amount of calcium present per unit of surface area by measuring the intensity of the X-ray fluorescence emitted from the coating; and controlling the thickness of the coating in accordance with the measured values.

3. A method according to claim 2, wherein said adding step comprises adding calcium carbonate to the glue in an amount such that the proportion of calcium carbonate present is from 0.5-20%.

4. A method according to claim 2, wherein said applying substep comprises applying the glue to a grammage of up to 100g/m².

5. A method according to claim 4, wherein the glue is applied to a grammage within a range of 1-75g/m².

6. A method according to claim 1 wherein said method includes controlling the thickness of a glue on a plastic foil, wherein said adding step comprises adding chlorinated paraffins to an isocyanate glue, and wherein said applying step comprises the substeps of:
applying the glue including the chlorinated paraffins to the plastic; and
controlling the thickness of the glue coating by measuring the intensity of the fluorescence emitted from the chloride present in the coating.

7. A method according to claim 1, wherein said method includes controlling the thickness of a priming coating of clear varnish including titanium oxide on wood, wherein said applying step comprises measuring the intensity of the fluorescence emitted from the titanium present in the varnish in the form of titanium oxide.

8. A method according to claim 1, wherein said method includes controlling the thickness of a plastic coating on plastic floorings or mats, wherein said applying step comprises measuring the intensity of the fluorescence emitted from strontium which is added to chalk which forms a filler in the plastic material.

9. A method according to claim 1, wheren said method includes controlling plastic coatings on plastic floorings or mats, wherein said applying step comprises measuring the intensity of the fluorescence emitted from zirconium which is added in zirconium-oxide form to titanium oxide.

10. A method according to claim 1, wherein said method includes controlling a glue coating of starch glue or acrylate glue on the curved apex surfaces of corrugated paperboard, wherein said adding step comprises adding zinc oxide to the starch glue or the acrylate glue.

11. A method of measuring layer thicknesses of coatings on a substrate, comprising the steps of:
adding an indicator substance which fluoresces in the X-ray wavelength band to a coating composition, the proportion in which the indicator substance is present being measurable by X-ray fluorescence;
forming a solution, slurry or melt from the coating composition including the indicator substance; and
applying the solution, slurry or melt to a substrate as a coating while monitoring the thickness of the coating on the basis of the intensity of the X-ray fluorescence emitted from the coating.

12. A method according to claim 11, wherein the coating composition is glue and the indicator substance is calcium carbonate, and wherein said adding step comprises adding the calcium carbonate to the glue in an amount such that the proportion of calcium carbonate present is from 0.5-20%.

13. A method according to claim 12, wherein the proportion is substantially 5%.

14. A method according to claim 11, wherein the coating composition is glue and wherein said applying step comprises applying the glue to a grammage of up to 100g/m².

15. A method according to claim 14, wherein the glue is applied to a grammage within a range of 1-75g/m².

16. A method according to claim 11, wherein the substrate is plastic foil and the coating composition is isocyanate glue, wherein said adding step comprises adding chlorinated paraffins to the isocyanate glue, and wherein said applying step comprises the substeps of:
applying the glue including the chlorinated paraffins to the plastic foil; and
measuring the thickness of the glue coating by measuring the intensity of the fluorescence emitted from the chloride present in the coating.

17. A method according to claim 11, wherein the substrate is plastic flooring, wherein the coating composition is a plastic coating, wherein said adding step comprises adding strontium to a chalk which forms filler for the plastic coating, and wherein said applying step comprises measuring the intensity of the fluoescence emitted from the strontium.

18. A method according to claim 11, wherein the substrate is plastic floorings and the coating composition is a plastic coating, wherein said adding step comprises adding zirconium oxide to the plastic coating, and wherein said applying step comprises measuring the intensity of the fluorescence emitted from the zirconium.

19. A method according to claim 11, wherein the substrate is formed by curved apex surfaces of corrugated paperboard, wherein the coating composition is a glue coating, and wherein said adding step comprises adding zinc oxide to the glue coating.

20. A method according to claim 3, wherein the proportion of calcium carbonate present is substantially 5%.

* * * * *